US012790496B2

(12) United States Patent
Marchand et al.

(10) Patent No.: US 12,790,496 B2
(45) Date of Patent: Nov. 10, 2026

(54) METHOD FOR PREPARING THIN FILMS, IN PARTICULAR BY MEANS OF THE SOL-GEL PROCESS

(71) Applicant: COMMISSARIAT À L'ÉNERGIE ATOMIQUE ET AUX ÉNERGIES ALTERNATIVES, Paris (FR)

(72) Inventors: Julien Marchand, Monts (FR); Frédéric Bertin, Monts (FR); Bertrand Bertussi, Monts (FR); Philippe Belleville, Monts (FR); Karine Valle, Monts (FR); Clément Sanchez, Monts (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/258,854

(22) PCT Filed: Dec. 9, 2021

(86) PCT No.: PCT/FR2021/052253
§ 371 (c)(1),
(2) Date: Jun. 22, 2023

(87) PCT Pub. No.: WO2022/136759
PCT Pub. Date: Jun. 30, 2022

(65) Prior Publication Data

US 2024/0043698 A1 Feb. 8, 2024

(30) Foreign Application Priority Data

Dec. 23, 2020 (FR) ...................................... 2014100

(51) Int. Cl.
*C09D 5/33* (2006.01)
*C09D 1/00* (2006.01)
(Continued)

(52) U.S. Cl.
CPC ............... *C09D 5/004* (2013.01); *C09D 1/00* (2013.01); *C09D 5/021* (2013.01); *C09D 7/20* (2018.01);
(Continued)

(58) Field of Classification Search
CPC .... B05D 1/34; B05D 1/36; B05D 1/02; C23C 18/12
See application file for complete search history.

(56) References Cited

U.S. PATENT DOCUMENTS 6,463,760 B1 10/2002 Fink-Straube
9,005,694 B2 * 4/2015 Popa ........................ B05D 1/34 427/427
(Continued)

FOREIGN PATENT DOCUMENTS

EP 1976940 B1 7/2019
FR 2703791 A1 10/1994
WO 9423315 A1 10/1994

OTHER PUBLICATIONS

Search Report for International Application No. PCT/FR2021/052253 dated May 2, 2022.
(Continued)

*Primary Examiner* — Dah-Wei D. Yuan
*Assistant Examiner* — Kristen A Dagenais
(74) *Attorney, Agent, or Firm* — Chrisman Gallo Tochtrop LLC

(57) ABSTRACT

A thin film on a surface of a solid substrate, including: a) spraying on the surface: —a colloidal suspension including solid nanoparticles (or colloids) of an inorganic compound dispersed in a solvent to obtain a wet layer of the colloidal suspension on the surface; or —a suspension including an inorganic compound in polymeric form in a solvent, to obtain a wet layer of the suspension of the inorganic
(Continued)

compound in polymeric form on the surface; or —a solution or suspension of an organic polymer in a solvent, to obtain a wet layer of the solution or suspension of the organic polymer on the surface; b) drying the wet layer; c) optionally, heat-treating the wet layer that has undergone the drying step, whereby the thin film is obtained; wherein: the solvent comprises at least 95% by weight of water, and the drying is carried out in a static atmosphere.

19 Claims, 6 Drawing Sheets

(51) Int. Cl.

| | |
|---|---|
| ***C09D 5/02*** | (2006.01) |
| ***C09D 7/20*** | (2018.01) |
| ***C09D 7/40*** | (2018.01) |
| ***C09D 7/61*** | (2018.01) |
| ***C09D 129/04*** | (2006.01) |
| ***C09D 171/02*** | (2006.01) |
| *C08K 3/36* | (2006.01) |

(52) U.S. Cl.
CPC ................. *C09D 7/61* (2018.01); *C09D 7/67* (2018.01); *C09D 129/04* (2013.01); *C09D 171/02* (2013.01); *C08K 3/36* (2013.01); *C08K 2201/011* (2013.01)

(56) References Cited

U.S. PATENT DOCUMENTS

2009/0047517 A1* 2/2009 Caruso ..................... B05D 1/36 427/213.33
2012/0028005 A1* 2/2012 Zheng ..................... C23C 14/10 427/164
2014/0037839 A1* 2/2014 Belleville ................. C01F 7/34 106/287.26
2018/0030282 A1 2/2018 Qin
2019/0193033 A1* 6/2019 Sahadevan ........... B01D 69/148
2020/0379144 A1* 12/2020 Makino .............. G02B 27/0006

OTHER PUBLICATIONS

Report on Patentability International Application No. PCT/FR2021/052253 dated Mar. 30, 2023.
Written Opinion of The International Searching Authority for Application No. PCT/FR2021/052253 dated May 2, 2022.

* cited by examiner

METHOD FOR PREPARING THIN FILMS, IN PARTICULAR BY MEANS OF THE SOL-GEL PROCESS

CROSS-REFERENCE TO RELATED APPLICATIONS

This is a National Stage application of PCT international application PCT/FR2021/052253, filed on Dec. 9, 2021, which claims the priority of French Patent Application No. FR 2014100, filed Dec. 23, 2020, both of which are incorporated herein by reference in their entirety.

TECHNICAL FIELD

The present invention relates to a method for preparing thin layers, especially by the sol-gel technique.

By thin layer, in the present case, it is meant a layer with a thickness of 5 nm to 300 nm, preferably 80 to 220 nm, These thin layers can be especially thin layers having optical properties, or layers having hydrophobic, hydrophilic, anti-fog properties, or abrasion- or scratch-resistant properties.

These thin layers can be deposited onto an organic or inorganic, mineral substrate, for example a substrate made of an organic polymer or a substrate made of a mineral glass.

The optical properties can be, for example, anti-reflective or reflective properties.

These thin layers have many applications.

Among the application fields of these thin layers, solar, thermal and photovoltaic applications, applications in integrated optical systems and building applications, for example in external glazing panels can especially be mentioned.

Thus, these thin layers are commonly used in optical systems, such as lasers or astronomical instruments, to minimise radiation losses by reflection, concentrate and focus light energy or protect certain absorbing elements.

STATE OF PRIOR ART

Various methods exist for manufacturing thin layers by deposition onto a substrate.

Among these methods, sol-gel deposition methods may especially be mentioned.

These methods are called "soft chemistry" and have the major advantage of not requiring a heat treatment step at a high temperature.

Among these sol-gel deposition methods, one method consists in preparing colloidal treatment solutions and depositing these solutions onto a substrate.

More precisely, this method consists in preparing a stable, homogeneous suspension of solid particles (namely, colloids), especially of a metal oxide or a metalloid oxide such as silica, dispersed in a liquid solvent, this suspension constituting what is called a "sol". This sol is deposited onto the substrate, and the solvent in the sol is then left to evaporate to form a "gel" on the substrate.

For thin layers to be able to be made, the solvent used has to be sufficiently volatile to evaporate easily and lead to the deposition of solid particles onto the substrate.

In the case of layers with optical properties, the refractive index of this solid particle deposit determines the optical properties thereof.

Techniques used for sol deposition are numerous.

Among these techniques, dip-coating, spin-coating and laminar-flow-coating, spray-coating, slip-casting and tape-casting or doctor blade-coating, can be mentioned.

As indicated in document [1], dip-coating, spin-coating and laminar-coating are the three main techniques used to prepare coatings with optical properties by the sol-gel technique, ensuring precise control of the deposited sol thickness to within a few nanometres.

These three techniques enable, on large silica substrates (400×400 $mm^2$), anti-reflective thin layers to be made, that can achieve optical transmissions greater than 99.5% of incident light, with satisfactory transmission homogeneity at the wavelength of interest of 351 nm or 1053 nm.

To make thin layers using the three above-mentioned techniques, the solvent generally selected is ethanol, because it is the solvent commonly used for colloid synthesis, and because it is a fast-drying solvent.

Document [1] moreover describes a method for manufacturing thin layers having optical properties, in which a colloidal solution, for example a silica colloidal solution, is prepared.

Here again, the solvent for the colloidal solution is selected from 1 to 4C aliphatic alcohols, such as ethanol.

The colloidal solution is deposited onto a substrate by means of a translating coating roller. A meniscus of colloidal suspension forms at the periphery of the coating roller and ensures deposition of a thin layer of colloidal suspension onto the substrate.

However, alcohols, such as ethanol, used as solvents in the three above-mentioned techniques and in the method of document [1] have the drawback of being flammable.

Document [2] therefore provides for the replacement of ethanol in colloidal silica sols by a mixture based on water and ethanol, but the change in solvent adversely affects deposition quality with the three previously mentioned techniques.

Document [3] describes an aqueous technique for depositing anti-reflective coatings which are made by dip-coating onto conductive oxide glasses of dye-sensitised solar cells.

The solutions used comprise silicon oxide $SiO_2$ and sodium oxide $Na_2O$ at different $SiO_2/Na_2O$ molar ratios. Deposits are rinsed to reduce presence of sodium ions in the final deposit. The transmission gain for one face (3.2%) does not provide the quality required for an application to power laser (minimum 4% transmission gain).

In addition to the drawbacks already mentioned above, related to the implementation of flammable or toxic solvents, the spin-coating method also has a number of other drawbacks. Indeed, the coated substrates are limited to those of smaller dimensions, and the corners of square or rectangular substrates are not properly coated.

The drawback of the dip-coating technique is that large amounts of solution have to be prepared in order to immerse the substrate to be treated.

Finally, the laminar-coating technique is essentially limited to coating planar substrates.

Furthermore, in addition to dip-coating, spin-coating and laminar-coating, another deposition technique has been the subject of much research, this is the spray-coating technique. This technique consumes very little solution and enables substrates of various shapes, especially non-planar substrates, to be coated.

Thus, in the field of organic photovoltaic cells, documents [4] and [5] have shown that the spray-coating technique is of economic interest, as the amount of solution used in this technique is small, and less than the amount of solution used in the three previously mentioned techniques.

According to document [4], for a 40 nm deposit of conductive polymer, the spray-coating technique, or more precisely the ultrasonic spray-coating technique, produces layers with a homogeneity comparable to that of a layer deposited by spin-coating. The mean square roughness is thus 3.6 nm for layers deposited by the spray-coating technique, while it is 1.2 nm for layers deposited by the spin-coating technique.

To achieve these results, the solvent used consists especially of a mixture of isopropanol and ethylene glycol, thus avoiding the use of surfactants.

Document [6] is directed to a method for preparing an optical layer of uniform thickness on a substrate, wherein a coating composition prepared by the sol-gel method, comprising an inorganic compound or an organically modified inorganic compound and a liquid phase comprising a high-boiling solvent, is sprayed onto the substrate. A wet film is thus formed, which is then heat treated to form the optical layer, which can have a thickness from 100 nm to 10 μm.

The organically modified inorganic compound may consist of inorganic oxide nano-sized particles on which polymerisable or polycondensable surface groups are present.

The solvent may be selected from glycols, glycol ethers, polyglycols, polyglycol ethers, polyols, terpenes and mixtures thereof.

Document [7] describes the preparation of $SiO_2$ anti-reflective coatings by spraying a sol onto glass substrates.

The sol is prepared by mixing TEOS, ethanol, deionised water and ammonia to obtain a base-catalysed sol. The sprayed sol is synthesised by mixing the base-catalysed sol with ethanol, isopropanol, n-propanol, n-butanol, and 1,3-butanediol.

On a quartz substrate of 21 cm by 30 cm, a deposit centred to a wavelength of 740 nm with a transmission of 99.61% is obtained. Deposits obtained by spray-coating are compared with deposits obtained by dip-coating.

Regardless of whether they are made par spray-coating or dip-coating, the deposits obtained have a comparable roughness, namely 1.42 nm for deposits obtained by spray-coating and 1.55 nm for deposits obtained by dip-coating.

However, defects appear on the deposits obtained by spray-coating, the origin of which is not yet certain. These defects are a major obstacle to achieving optical grade, namely a deposit with an even, uniform, homogeneous thickness to within a few nanometres over the entire deposit—on a large component, for example with a surface area of 400 $cm^2$.

Document [8] describes the preparation of $SiO_2$ layers from alkoxide-based sols by a spray-coating technique. When the sols contain only ethanol as a solvent, the coatings obtained have heterogeneous structures, especially with cracks. By using high-boiling additives such as 1,3-butanediol, ethylene glycol or glycerol, crack-free coatings with low surface roughness can be prepared.

It therefore appears that, while the spray-coating technique enables optical thin layers with good transmission properties to be obtained, it does not enable defect-free, optical-quality films to be obtained, especially on large substrates. In addition, this technique implements flammable and/or toxic solvents.

In view of the above, there is thus a need for a method for preparing thin layers by sol-gel process using a spray-coating technique which does not have the drawbacks, defects, limitations and disadvantages of methods of prior art, and which provides a solution to the problems encountered in methods of prior art.

In particular, there is a need for such a method implementing a non-flammable, non-toxic sol solvent.

Furthermore, there is a need for such a method to enable precise control of the deposited sol thickness, and then the preparation of thin layers with a uniform, homogeneous thickness, controlled to within a few nanometres, especially with a thickness precision less than or equal to 5 nm, better still less than or equal to 2 nm (for a layer thickness greater than or equal to 50 nm).

Furthermore, there is also a need for such a method, which enables high quality, continuous layers to be obtained, having no defects such as cracks, even on large substrates, for example with a surface area equal to or greater than 400 $cm^2$, and/or non-planar substrates having complex shapes.

In particular, there is a need for such a method which enables "optical grade" layers to be obtained with especially high transmissions on large and/or non-planar substrates.

In particular, there has been no method to date that enables the safe preparation of defect-free optical grade coatings even on large substrates.

The purpose of the present invention is to provide a method for preparing thin layers by sol-gel process which, among other things, meets the needs listed above.

DISCLOSURE OF THE INVENTION

This purpose as well as others are achieved, in accordance with the invention, by a method for preparing a thin layer on at least one surface of a solid substrate, comprising the following successive steps:

a) spraying onto the surface:
   - a colloidal suspension comprising solid nanoparticles (or colloids) of an inorganic compound dispersed in a solvent, whereby a wet layer of the colloidal suspension is obtained on the surface; or
   - a suspension comprising an inorganic compound in polymeric form in a solvent, whereby a wet layer of the suspension of the inorganic compound in polymeric form is obtained on the surface; or
   - a solution or suspension of an organic polymer in a solvent, whereby a wet layer of the solution or suspension of the organic polymer is obtained on the surface;

b) drying the wet layer;

c) optionally, heat treating the wet layer having undergone the drying step;

whereby the thin layer is obtained;

the method being characterised in that:
   - the solvent comprises at least 95% by mass of water, preferably 100% by mass of water, and in that
   - drying is carried out in a static atmosphere, especially without circulation, flow of air or of any other gas on and around the surface; preferably, drying is carried out in a closed, hermetic enclosure in which there is no circulation, flow of air or of any other gas.

The solvent, such as pure water (in the case where the solvent comprises 100% by mass of water, consists of water), represents at least 95% by mass, preferably at least 96, 97, 98, 99%, 99.9% by mass of the total mass of the colloidal suspension comprising solid nanoparticles (or colloids) of an inorganic compound dispersed in a solvent, or of the suspension comprising an inorganic compound in polymeric form in a solvent, or of the solution or suspension of the organic polymer.

The colloidal suspension comprising solid nanoparticles (or colloids) of an inorganic compound dispersed in a solvent is commonly referred to as a colloidal sol, for example a silica colloidal sol. The term colloidal sol is widely used in this field of technique, and has a widely accepted meaning.

The suspension comprising an inorganic compound in polymeric form in a solvent, is commonly referred to as a polymeric sol, for example a silica polymeric sol or a polymeric silica sol. The term "polymeric sol" is widely used in this field of technique and has a widely accepted meaning.

In a polymeric sol, the inorganic compound is in the form of an inorganic-organic hybrid polymer. This is the form in which it is found at the moment of spray-coating. This hybrid compound completes its conversion into an inorganic compound during drying and then during the heat treatment.

The solution or suspension of an organic polymer in a solvent may be referred to as an organic suspension or solution.

The optional heat treatment of step c) can especially be carried out in the case where, in step a), spraying of a suspension comprising an inorganic compound in polymeric form in a solvent is carried out, in other words, spraying of a polymeric sol.

In the case of spray-coating a colloidal sol or a polymeric sol onto the surface, the method according to the invention can be defined as a method for preparing a thin layer by the sol-gel technique.

The nanoparticles of the colloidal sol can generally have a larger average dimension, such as an average diameter, in the case of spherical or spheroidal particles, of 5 to 40 nm, preferably 5 to 20 nm, still preferably 10 to 18 or 19 nm.

Advantageously, the thickness of the thin layer can be from 5 nm to 300 nm, preferably from 80 to 220 nm.

The method according to the invention differs fundamentally from methods for preparing a thin layer, especially from methods for preparing a thin layer by the sol-gel technique, of prior art, as represented in particular by the documents mentioned above, in that it implements, to carry out the deposition of a colloidal or polymeric suspension of an inorganic compound, or of a suspension or solution of an organic polymer, a specific technique, namely a spray-coating technique, and furthermore in that the solvent of this colloidal or polymeric suspension or of this solution or suspension of an organic polymer is a specific solvent, namely an aqueous solvent comprising at least 95% by mass of water, preferably 100% by mass of water.

The use of aqueous sols or aqueous solutions or suspensions in a spray-coating technique for preparing thin layers, especially optical grade thin layers, especially on large substrates (namely with a surface area onto which the sol deposition is performed of a size greater than 400 cm 2) is neither described nor suggested in prior art, as represented especially by the documents mentioned above.

The method according to the invention does not have the drawbacks, defects, limitations and disadvantages of methods of prior art, especially the spray-coating deposition methods of prior art, and it provides a solution to the problems of methods of prior art.

The method according to the invention implements, surprisingly, the spray-coating technique with aqueous colloidal or polymeric suspensions, or with aqueous solutions or suspensions of organic polymers, and enables the preparation of thin layers, especially thin layers having a homogeneous, uniform thickness, in particular optical grade thin layers.

This control of the thickness of the thin layer is the essential and advantageous characteristic which fundamentally differentiates the method according to the invention from methods of prior art. According to the invention, this control of the thickness of the thin layer is made possible especially by controlling the evaporation of the solvent, namely essentially water, during the drying step which takes place in a static atmosphere, especially without circulation, flow of air or any other gas on and around the surface; preferably, drying is carried out in a closed, hermetic enclosure in which there is no circulation, flow of air or any other gas, as described below.

A drying step carried out, according to the invention, in a static atmosphere, is neither described nor suggested in prior art, as represented especially by the documents mentioned above.

Such a drying step carried out in a static atmosphere brings unexpected effects and advantages, as it thus makes it possible to prepare thin layers, especially thin layers having a homogeneous, uniform thickness, in particular optical grade thin layers.

By layer having a homogeneous, uniform thickness, it is generally meant a layer with a variation in its thickness not exceeding 5 nm, preferably not exceeding 2 nm, over the entire surface area, for a thickness of the thin layer greater than or equal to 50 nm.

By thin layer of "optical grade", it is generally meant that:

this layer has a homogeneous, uniform thickness as defined above, and this layer has no scattering.

For there to be no scattering, for example in the case where a colloidal sol is sprayed, the nanoparticles have to be sufficiently small in relation to the wavelength(s) at which the layer has to ensure its function.

For example, the average size, such as the average diameter, of the nanoparticles has to be at least 10 times smaller than the smallest working wavelength used, to which the layer is exposed, and preferably at least 20 times smaller than this wavelength.

Thus, if this wavelength is 370 nm, the average size, such as the diameter of the nanoparticles, should not exceed 37 nm, and preferably not exceed 18.5 nm.

The method according to the invention makes it possible, surprisingly, to prepare thin layers, especially thin layers having a homogeneous, uniform thickness, in particular optical grade thin layers, over the whole of large surface areas, namely surface areas of a size greater than or equal to 400 $cm^2$, for example on square surface areas defined by sides of a length greater than or equal to 200 millimetres. Never before has it been possible to obtain a layer with such a precise thickness (controlled to within 5 nm, for example, or better to within 2 nm, for a thickness of the thin layer of 50 nm or more), and especially with such optical grade, on a large surface area and not just on a "small" surface area.

The thin layers prepared by the method according to the invention are generally continuous and the entire surface area is well coated with a thin layer.

The method according to the invention has numerous advantages over methods of prior art.

One of the first advantages of the method according to the invention is that it completely eliminates the risks of flammability due to the implementation of flammable solvents, such as ethanol, in methods of prior art.

Indeed, the colloidal or polymeric solution, or the solution or suspension of organic polymer implemented according to the invention, contains an aqueous solvent comprising at least 95% by mass of water, preferably 100% by mass of water. This solvent therefore has a flash point above 60° C., and therefore falls into the category of non-flammable solvents according to the CLP regulation (EC regulation n ° 1272/2008 modified).

The aqueous solvent implemented in the method according to the invention is not toxic or harmful.

Furthermore, the use as a solvent, of an aqueous solvent which is less volatile than the solvents used until now, such as ethanol, ensures better deposit quality.

Indeed, water, which constitutes at least 95% by mass of the solvent of the colloidal or polymeric sols, or solutions or suspensions of an organic polymer, implemented according to the invention, has a higher boiling temperature and vaporisation enthalpy at room temperature than ethanol, which enables, for the same volumes of sol, solution or suspension, drying to be slowed down. Slower drying enables residual stresses to be limited, thus better-quality layers to be obtained.

Finally, the spray-coating technique consumes smaller amounts of sol, suspension or solution, much smaller than other techniques, which reduces the cost of the method.

Thus, by way of example, a few millilitres of sol, suspension or solution enable just one face to be coated at a time, allowing asymmetrical coatings to be made.

Indeed, the spray-coating technique uses only the amount of sol, solution or suspension strictly necessary for deposition.

This is a major advantage of the spray-coating technique, especially compared with the dip-coating technique, which uses large amounts of sol, solution or suspension to coat both faces of a substrate.

Furthermore, in the dip-coating technique, the layer deposited onto both faces of a substrate has exactly the same composition and thickness on each of the two faces.

In other words, exactly the same layer is deposited onto each face of the substrate.

In contrast, the spray-coating technique enables layers of different thicknesses and/or compositions to be deposited onto each of the faces, thus enabling a wide variety of deposits.

In this respect, the spray-coating technique is similar to spin-coating.

Advantageously, the inorganic compound can be an inorganic oxide such as a metal or metalloid oxide, an inorganic fluoride such as a metal or metalloid fluoride, an inorganic oxyhydroxide, such as a metal or metalloid oxyhydroxide or a mixture thereof.

Oxides also comprise mixed oxides, fluorides also comprise mixed fluorides, and oxyhydroxides also comprise mixed oxyhydroxides.

Advantageously, the inorganic oxide may be selected from silicon oxides such as $SiO_2$, aluminium oxides, titanium oxides such as $TiO_2$, zirconium oxides such as $ZrO_2$, hafnium oxides such as $HfO_2$, thorium oxides such as $ThO_2$, tantalum oxides such as $Ta_2O_3$, niobium oxides such as $Nb_2O_5$, yttrium oxides, scandium oxides, lanthanum oxides, lead oxides, boron oxides, cerium oxides, molybdenum oxides, tungsten oxides, vanadium oxides, $P_2O_3$, alkali metal oxides, alkaline earth metal oxides, mixtures of said oxides and mixed oxides of two or more of the above-mentioned elements; the inorganic oxyhydroxide may be selected from metal oxyhydroxides such as AlOOH; and the inorganic fluoride may be selected from alkaline earth metal fluorides, such as $CaF_2$ and $MgF_2$.

Advantageously, the organic polymer may be selected from synthesisable or water-soluble polymers such as polyvinyl alcohols or poloxamers such as Pluronic® F-108, and latex-type suspension polymers.

Advantageously, the concentration of nanoparticles of an inorganic compound of the colloidal solution, or the concentration of inorganic compound in polymeric form of the suspension comprising an inorganic compound in polymeric form, or the concentration of organic polymer of the solution or suspension of organic polymer, can be from 0.1% to 1% by mass.

Advantageously, the colloidal solution, or the suspension comprising an inorganic compound in polymeric form, or the solution or suspension of an organic polymer can have a surface tension of 20 to 73 $mN \cdot m^{-1}$.

Advantageously, the colloidal solution, or the suspension comprising an inorganic compound in polymeric form, or the solution or suspension of an organic polymer, may further comprise an additive selected especially from surfactants, thickeners and flow agents.

Surfactants may be selected, for example, from Triton™ X-100 (polyethylene glycol tert-octylphenyl ether) or Brij® L4 (polyethylene glycol dodecyl ether).

Wetting agents (surfactants) are the most important within the scope of the spray-coating technique. However, other additives may also play a role, such as thickeners or flow agents, which influence sol viscosity and impact deposit quality.

The organic polymer, such as a poloxamer, may already have surfactant properties, in which case the addition of a surfactant is not necessary.

In the case where a colloidal sol is implemented, this colloidal sol may further comprise a water-soluble binder polymer such as polyvinyl alcohol (PVA).

Advantageously, the surface is a large surface, namely a surface of at least 400 $cm^2$. For example, it can be a square surface with sides of at least 200 mm.

Advantageously, in step a), one or more of the following parameters (spraying parameters), preferably all of the following parameters, can be controlled so as to form a continuous wet layer (of the colloidal suspension, or of the suspension comprising an organic compound in polymeric form, or of the solution or suspension of an organic polymer) of uniform thickness: flow rate of the colloidal suspension, or of the suspension comprising an organic compound in polymeric form, or of the solution or suspension of an organic polymer, supplying a spray head with which spraying is carried out, displacement rate of the spray head, distance between the spray head and the surface, trajectory described by the spray head.

Advantageously, the thickness of the wet layer of the colloidal suspension, or of the suspension comprising an organic compound in polymeric form, or of the solution or suspension of an organic polymer can be from 10 to 150 μm, preferably from 10 μm to 120 μm.

Advantageously, drying can be carried out at a temperature of 18 to 50° C., for a duration of 10 minutes to 90 minutes, preferably 30 to 60 minutes, more preferably 30 to 40 minutes.

According to the invention, drying is carried out in a static atmosphere, especially without circulation, flow, of air or any other gas on and around the surface.

Preferably, drying is carried out in a closed, hermetic enclosure in which there is no circulation, flow of air or any other gas.

This enclosure may include one or more caulked doors, especially at the corners, and a barrier impeding the flow of air (air barrier) may be placed behind this door or these doors.

Optionally, following the drying step, a heat treatment of the wet layer that has undergone the drying step may be carried out, in particular in the case where, during step a), spraying of a suspension comprising an organic compound in polymeric form is performed. In the case where a polymeric sol has been sprayed, this heat treatment step enables the inorganic-organic hybrid polymer to be transformed into a fully inorganic, mineral polymer.

This heat treatment is generally different, distinct from drying, and is carried out at a higher temperature than that used for drying. This heat treatment can thus be carried out at a temperature of 100 to 200° C., preferably 100 to 150° C., for a duration of 30 minutes to 2 hours, preferably 60 minutes. It is especially the use of adequate projection parameters, of an adapted aqueous sol, solution or suspension, in terms of concentration and surface tension, and of controlled drying conditions for the wet layer that provide a solution to the problems discussed above, and especially make it possible to obtain a final dry thin layer having the desired properties, especially a layer free from defects, cracks, of homogeneous, uniform thickness and optical grade.

Advantageously, the thin layer can be a layer with optical properties, a hydrophobic layer, a hydrophilic, anti-fog layer, or a layer with abrasion- or scratch-resistant properties.

The optical properties may be, for example, anti-reflective properties or reflective properties or polarizing properties.

The person skilled in the art will know how to choose the conditions of the method according to the invention, and especially the inorganic compound and the thickness of the layer, to obtain a thin layer having the desired properties, for example the desired optical properties. In particular, the person skilled in the art will be able to choose the conditions of the method according to the invention to obtain a thin layer having the desired refractive index according to the desired optical properties which are determined by this refractive index.

Thus, for example, anti-reflective layers are generally silica layers.

These thin layers have many applications.

The thin layers prepared by the method according to the invention can especially be anti-reflective layers. These anti-reflective layers can be anti-reflective layers of a coating subjected to laser radiation or other radiation (visible, IR, UV, etc.).

The method according to the invention enables, indeed, anti-reflective coatings to be made by the spray-coating technique, which are compatible with an application to lasers.

The invention also relates to a method for preparing a coating comprising several layers (multilayer coating) on at least one surface of a solid substrate, wherein at least one of the layers, such as an anti-reflective layer, is deposited by the method according to the invention as described above.

Preferably, all the layers of the coating are prepared by the method according to the invention.

Overall, these multilayer coatings can have properties such as anti-reflective, reflective or polarizing properties.

To prepare multilayer reflective coatings, transparent dielectric materials (oxides) deposited in alternating layers are used, constituting a successive stack of low and high refractive index layers. Each of these layers can be prepared using the method according to the invention. In particular, the low refractive index layer, which is generally based on colloidal silica, can be prepared by the method according to the invention.

The invention will be better understood upon reading the following detailed description of a particular embodiment of the invention.

This detailed description is illustrative and non-limiting, with reference to the attached drawings.

The abscissa shows the wavelength (in nm), and the ordinate shows the transmission (in %).

Figure 5:
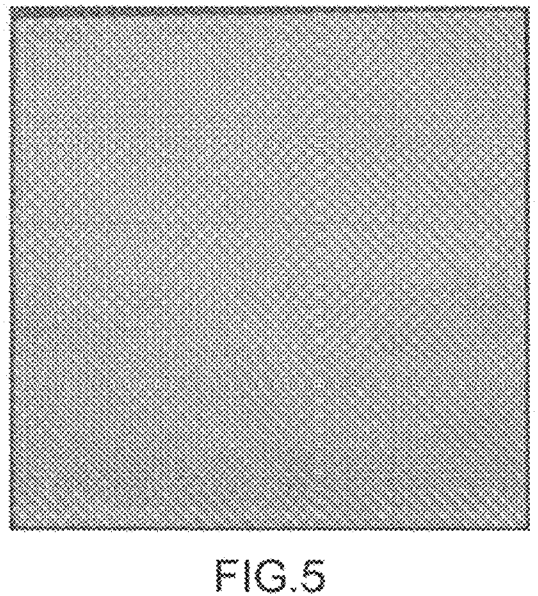

FIG. 5 is a photograph showing the appearance of a symmetrical coating on two faces of a substrate. This coating consists of a layer, prepared in Example 2 by the method according to the invention.

Figure 6:
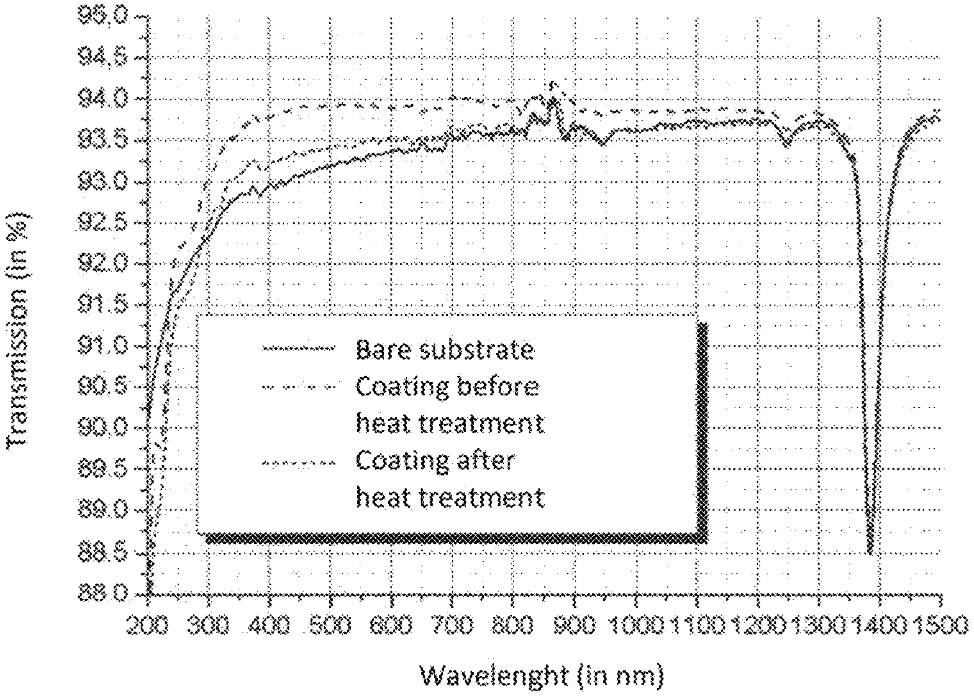

FIG. 6 is a graph showing the transmission spectrum of the bare substrate (bottom curve in solid lines); the transmission spectrum of the substrate coated symmetrically on its two faces with a layer prepared in Example 2 in accordance with the method according to the invention before heat treatment (top curve in dashed lines); and the transmission spectrum of the substrate coated symmetrically on its two faces with a layer prepared in Example 2, in accordance with the method according to the invention after heat treatment (middle curve in dotted lines).

The abscissa shows the wavelength (in nm), and the ordinate shows the transmission (in %).

Figure 7:
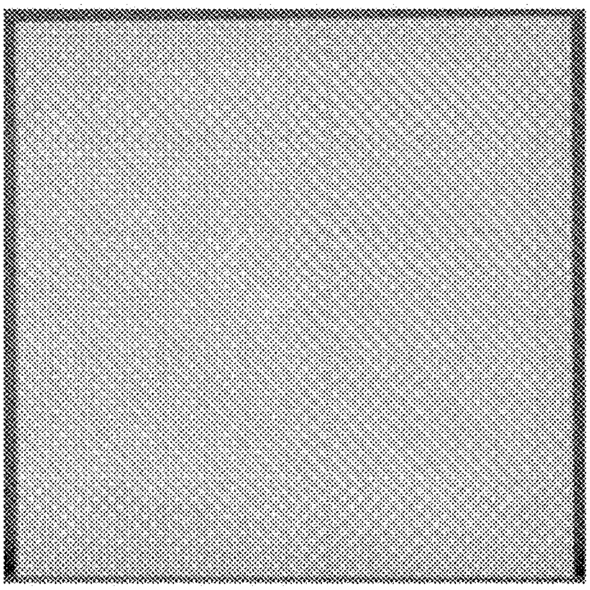

FIG. 7 is a photograph showing the appearance of a symmetrical coating on two faces of a substrate. This coating consists of a layer, prepared in Example 3 by the method according to the invention.

Figure 8:
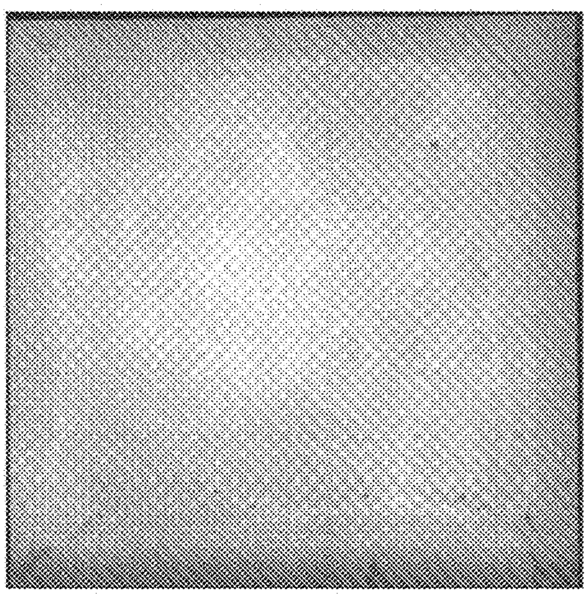

FIG. 8 is the same photograph as FIG. 7, but with the contrast exacerbated and the brightness dimmed.

Figure 9:
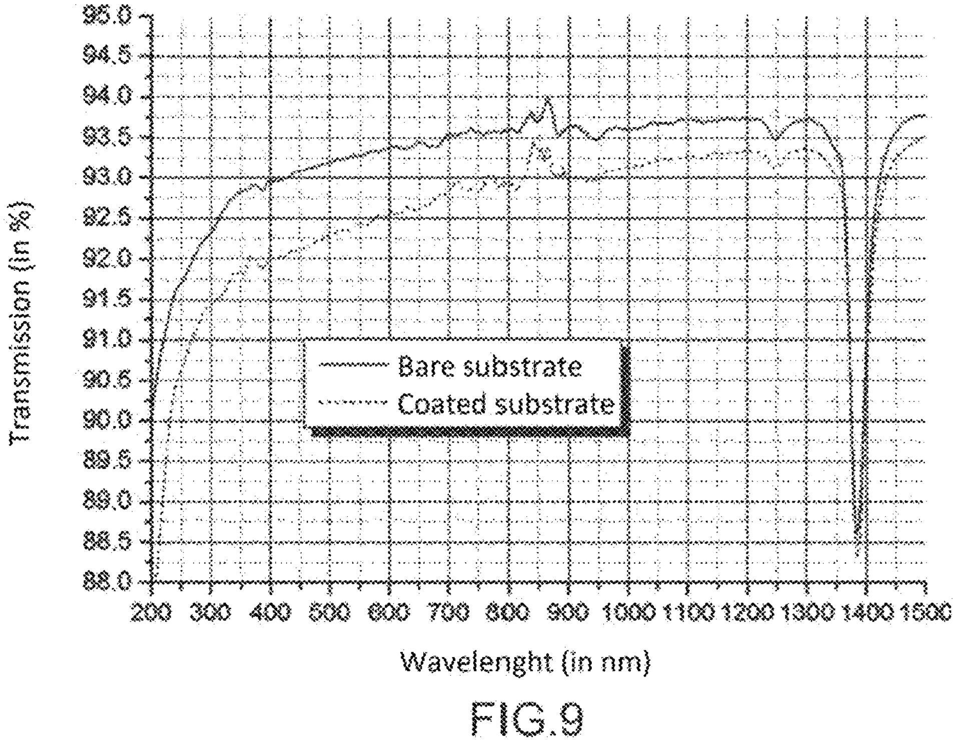

FIG. 9 is a graph showing the transmission spectrum of the bare substrate (top curve in solid lines), and the transmission spectrum of the substrate coated symmetrically on its two faces with a layer prepared in Example 3, in accordance with the method according to the invention (bottom curve in dotted lines).

The abscissa shows the wavelength (in nm), and the ordinate shows the transmission (in %).

Figure 10:
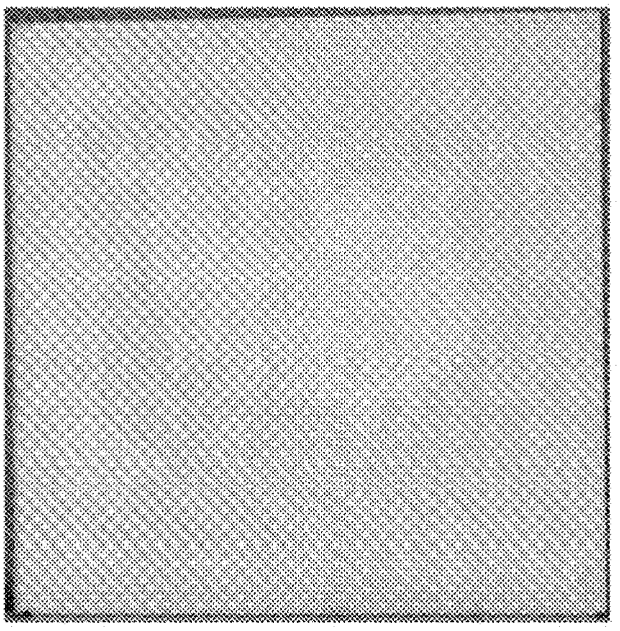

FIG. 10 is a photograph showing the appearance of a symmetrical coating on two faces of a substrate. This coating consists of a layer, prepared in Example 4 by the method according to the invention.

Figure 11:
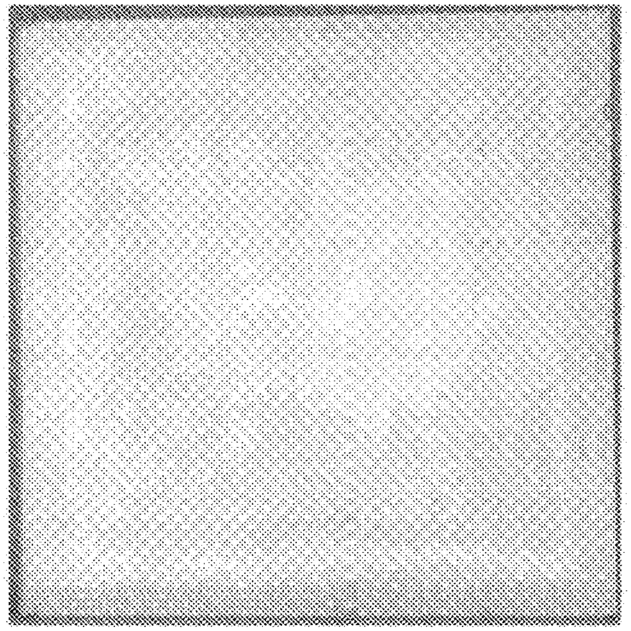

FIG. 11 is the same photograph as FIG. 10, but with the contrast exacerbated and the brightness dimmed.

Figure 12:
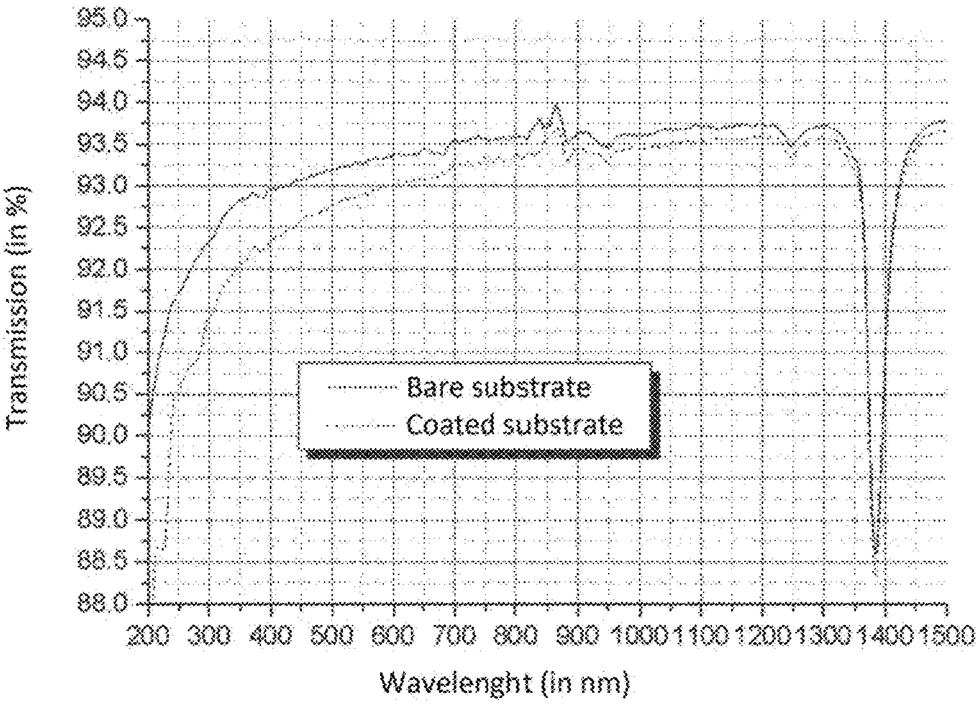

FIG. 12 is a graph showing the transmission spectrum of the bare substrate (top curve in solid lines), and the transmission spectrum of the substrate coated symmetrically on its two faces with a layer prepared in Example 4, in accordance with the method according to the invention (bottom curve in dotted lines).

The abscissa shows the wavelength (in nm), and the ordinate shows the transmission (in %).

DETAILED DISCLOSURE OF PARTICULAR EMBODIMENTS

In the following detailed description, the method according to the invention is described in one embodiment in which a colloidal or polymeric sol is implemented. However, this description could also be applied, with a few possible slight adaptations within the reach of the skilled person, to the embodiments of the method of the invention in which a solution or suspension of organic polymer is implemented.

The method according to the invention especially implements a colloidal suspension or sol comprising nanoparticles (or colloids) of an inorganic compound dispersed in a specific solvent which comprises at least 95% by mass of water, preferably 100% by mass of water.

The colloidal suspensions or sols used in the method according to the invention can be derived from ionic precursors such as acid salts, generally purified by recrystallisation, or from molecular precursors such as alkoxides, generally purified by recrystallisation.

Ionic precursors may be selected from chlorides, oxychlorides, perchlorates, nitrates, oxynitrates and metal acetates and chlorides, oxychlorides, perchlorates, nitrates, oxynitrates and metalloid acetates.

Molecular precursors may be selected from alkoxides of the formula M(OR) n, where M represents a metal or metalloid, OR is an alkoxy group of 1 to 6 carbon atoms and n represents the valency of the metal or metalloid.

The colloidal suspensions or sols used in the method according to the invention can be prepared according to the methods of the following authors:

Stöber (J. Colloid Interface Sci., 26, pp. 62-69, 1968) for $SiO_2$ sols.

Thomas (Appli. Opt. 26, 4688, 1987) for $TiO_2$ sols.

Clearfield (Inorg. Chem., 3, 146, 1964) for $ZrO_2$ and $HfO_2$ sols.

O'Connor (U.S. Pat. No. 3,256,204, 1966) for $ThO_2$ sols.

Yoldas (Am. Cer. Soc. Bull. 54, 289, 1975) for AlOOH sols.

S. Parraud (MRS, Better Ceramics Through Chemistry, 1991) for $Ta_2O_5$ and $Nb_2O_5$ sols.

Thomas (Appl. Opt., 27, 3356, 1988) for $CaF_2$ and $MgF_2$ sols.

In these methods, the precursor is hydrolysed or fluorinated, then polymerised until insoluble nanoparticles are obtained in the selected synthesis solvent, such as ethanol.

For example, silica sols can be obtained by hydrolysis of an alkoxide precursor, such as tetraethyl orthosilicate (TEOS), in a basic alcoholic medium the solvent of which is an aliphatic alcohol such as ethanol, following the method described by Stôber.

The sol can also be a polymeric sol, for example a silica sol in polymeric form.

A polymeric sol contains macromolecules (polymers), which may optionally form agglomerates or pellets of polymeric chains, but these are not solid particles.

Colloidal or polymeric sols synthesised as described above are then generally diluted with the synthesis solvent to a concentration of especially 0.2 to 1% by mass, for example 0.8% by mass, of inorganic compound in nanoparticle or polymeric form.

This concentration decreases a little during dialysis, but after dialysis it is adjusted to the concentration of the sol used during spraying by adding water (see below).

The synthesis solvent (if it is not water), such as ethanol, is then replaced by, exchanged for water, until the solvent of the colloidal or polymeric sol comprises the desired water content which is at least 95% by mass, or even 100% by mass.

This exchange can be carried out by dialysis in water.

Dialysis can take place over a duration of 6 to 72 hours, for example 48 hours, by regularly changing water, until the colloidal or polymeric solvent has the desired water content, which is at least 95% by mass, or even 100% by mass.

Heating during the dialysis step can accelerate exchanges, but heating can also promote particle aggregation. It is therefore preferable to carry out dialysis at room temperature (for example 20° C.), even if this takes longer.

This step of replacing, changing the synthesis solvent, such as dialysis, applies especially to silica nanoparticle solutions, but also to polymeric silica sols if they are suspensions in ethanol, and also optionally to suspensions or solutions of organic polymers.

After this step of replacing the synthesis solvent with water, especially by dialysis, it is possible to add an additive such as a surfactant (see above).

As already specified above, this surfactant may be selected for example from Triton™ X-100 (Polyethylene glycol tert-octylphenyl ether) or Brij® L4 (Polyethylene glycol dodecyl ether).

A surfactant enables better wetting and therefore better spreading of the colloidal or polymeric sol onto the surface to be treated.

In the case where a colloidal sol is implemented, a water-soluble binder polymer such as polyvinyl alcohol (PVA) can be added to the colloidal sol. Such a polymer thus acts as a binder or cement between the nanoparticles in the dry thin layer. Such a polymer reinforces the cohesion of the layers and plugs the porosity of these layers.

Following the step of replacing the synthesis solvent with water, and the optional step of adding an additive, such as a surfactant, the colloidal suspension (colloidal sol) or polymeric sol finally obtained has a concentration of nanoparticles of an inorganic compound such as a metal or metalloid oxide, or of an inorganic compound in polymeric form, namely a dry extract, generally of 0.1% to 1% by mass, for example 0.2% by mass.

Such a concentration enables dry layers to be made, especially with a thickness of 50 nm to 100 nm, for example in the order of 70 nm.

In the case where a solution or suspension of an organic polymer is implemented, this polymer is generally simply dissolved or suspended in the aqueous solvent comprising at least 95% by mass of water to obtain the desired concentration.

An additive such as a surfactant may optionally be added to the solution or suspension.

The solid substrate on at least one surface of which a thin layer is deposited may be made of an organic or inorganic material, or of an organic/inorganic hybrid material.

The substrate material may especially be an organic glass or a mineral glass, such as borosilicate glass or silica.

The surface on which a thin layer is prepared by the method according to the invention can be a planar surface, but it can also be a surface having a complex shape, geometry, for example a bent or curved surface, with concavities and/or convexities, with reliefs and/or hollows, nooks, recesses etc.

The spray-coating technique implemented in the method according to the invention, unlike the other deposition methods described above, makes it possible to successfully deposit a colloidal or polymeric sol or a solution or suspension of an organic polymer even onto surfaces with complex shapes and geometries.

The thin layer can be prepared on only one of the surfaces of the substrate or on several surfaces of the substrate, or even on all surfaces of the substrate.

Here, too, the spray-coating technique implemented in the method according to the invention makes it possible, unlike the other deposition methods described above, to deposit a colloidal or polymeric sol or a suspension or solution of an organic polymer in a single operation, onto several surfaces of a substrate, for example on both faces of a planar substrate, but also to deposit a colloidal or polymeric sol or a suspension or solution of an organic polymer onto only one of the faces of such a substrate, thus saving on suspension.

The surface on which a thin layer is prepared using the method described above can be of any size.

Unlike the other deposition methods described above, the spraying technique implemented in the method according to the invention makes it possible to deposit a colloidal or polymeric sol or a solution or suspension of an organic polymer even onto a large surface area, namely a surface area of at least 400 $cm^2$. For example, this may be a square surface area with sides of at least 200 mm.

Prior to step a) of the method according to the invention, during which the colloidal or polymeric sol or a solution or suspension of an organic polymer—this colloidal or polymeric sol being prepared especially as described above—is sprayed onto a surface of a substrate, a step for preparing this surface can be performed.

The purpose of this preparation step is essentially to make the surface wettable, that is, with a contact angle with water of less than 5°.

Such a step is conventional and common, and the person skilled in the art will have no difficulty in determining its conditions.

This step may be a chemical and/or physical and/or mechanical cleaning step.

Generally speaking, this cleaning step is essentially chemical.

The chemical agents that can be used for chemical cleaning may be selected from soaps, acids, bases, organic solvents, etc.

Ultrasound can assist chemical cleaning in the liquid phase with the above-mentioned chemical agents. They accelerate the phenomena governing cleaning.

Cleaning can also be carried out by ozone treatment or plasma cleaning.

By way of example, this cleaning step can be carried out by performing the following treatments:

- first, any traces of handling or potential dust are removed from the surface using an ethanol-soaked polyester cloth;
- the surface is then brought into contact with a 0.4% by mass dilute aqueous hydrofluoric acid solution. This can be carried out by bringing the surface into contact with a cloth soaked with the hydrofluoric acid solution. The soaked cloth may optionally be moved mechanically.
- and then rinsing of the surface is carried out with pure water to neutralise any trace of acid.
- final rinsing with ethanol may be performed to accelerate surface drying.

These treatments can be carried out, for example, on one or both faces of a planar substrate, whether it is made of silica or borosilicate.

The preparation step can also be carried out according to other protocols such as that described in document [1] page 77, lines 7 to 18, that described in document [1], claim 7 (the surface is cleaned using an aqueous detergent solution and an ethanol solution), or that described in document [9] page 7, lines 16 to 18 (the surface is cleaned using diluted HF and a detergent solution).

Once the colloidal or polymeric sol or the solution or suspension of an organic polymer has been prepared as disclosed above, a surfactant can optionally be added as already specified above.

This surfactant may be selected for example from Triton™ X-100 (Polyethylene glycol tert-octylphenyl ether) or Brij® L4 (Polyethylene glycol dodecyl ether).

The addition of a surfactant lowers the surface tension of the colloidal or polymeric sol or solution or suspension of an organic polymer.

To avoid destabilising the colloidal or polymeric sol, or the solution or suspension of an organic polymer, the surfactant is preferably added at a concentration less than or equal to the critical micellar concentration.

At this concentration, the effect of the surfactant on surface tension is optimal without forming micelles.

In other words, the surfactant concentration of the colloidal or polymeric sol or of the solution or suspension of an organic polymer, can be as high as the Critical Micellar Concentration (CMC) of the surfactant. The surfactant concentration may optionally exceed the CMC, but not by more than 10%.

Indeed, if the surfactant concentration exceeds the CMC by too much, the stability of the sol, or of the solution or suspension, is compromised, and gelling of the sol is observed within 1 month.

The surface tension of the colloidal or polymeric sol or solution or suspension of an organic polymer can be from 20 to 73 $mN \cdot m^{-1}$.

Using Triton X-100 for example enables a surface tension of 38 $mN \cdot m^{-1}$ to be achieved.

The colloidal or polymeric sol or solution or suspension of an organic polymer, prepared as described above, optionally comprising a surfactant, is then sprayed in the form of droplets, which are projected by a steering gas onto the surface.

More precisely, a piezoelectric head generates ultrasounds which form droplets in proximity to the head. A stream of gas, generally a flow of air, then directs the formulated droplets in the direction of deposition.

This spraying can be performed by any adequate apparatus. Such apparatuses are known to those skilled in the art.

For example, it can be an ultrasonic spraying apparatus such as that available from Ultrasonic Systems Inc. company under the name PRISM Ultra-coat.

During the spraying step a), one or more of the following parameters, preferably all of the following parameters, can be controlled so as to form a continuous, homogeneous wet layer of colloidal or polymeric sol or solution or suspension of organic polymer, after levelling (By levelling, it is meant that the liquid film deposited rests by gravity and that an equalisation of the thickness of this film occurs. In other words, the levelling step is a step during which the liquid film deposited takes on a smooth appearance. Spray deposition indeed produces a disrupted liquid film, which has small ripples betraying differences in thickness that smooth out during levelling):

flow rate of the colloidal or polymeric sol or suspension or solution of organic polymer supplying a spray head with which spraying is performed. This flow rate can be especially from 1 to 20 mL·min$^{-1}$.

displacement rate of the spray head. This rate can be especially 50 to 500 mm·s$^{-1}$.

distance between the spray head and the surface. This distance can be especially from 5 mm to 50 mm, preferably 20 mm.

trajectory described by the spray head.

Figure 1:
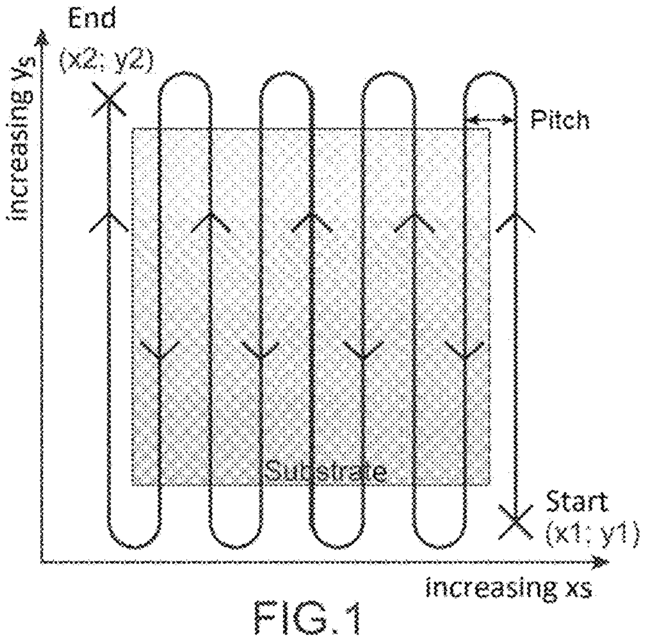
FIG. 1 is a graph showing an example of a trajectory described by a spray head in order to ensure full coverage of a substrate.

This trajectory can be, for example, that described in FIG. 1, with a pitch adjustable between 1 mm and 25 mm to ensure full coverage of the substrate.

If the distance between the head and the substrate is greater than 50 mm, the droplets generated have a too great distance to travel for their trajectory to be rectilinear. This promotes the appearance of zones with no liquid, and hence with no resulting deposit.

Below 10 mm, the steering air jet can disrupt the liquid film and generate streaky drying, with a periodic excessive thickness defect in the passage direction of head travel.

The flow rate, displacement rate and pitch form a set of parameters that condition the amount of liquid sprayed. Increasing the flow rate increases the amount of liquid deposited, while increasing the pitch or displacement rate of the head reduces the amount of liquid deposited.

The pitch should generally be less than 25 mm (the width of the spray band), as the projection head used can make a 25 mm liquid band. Beyond this, there is no coverage of the liquid film, resulting in zones with no deposit.

The flow rate generally has to remain below 20 mL·min$^{-1}$ to avoid the formation of droplets derived from droplet coalescence. Its minimum value is set by the machine.

Displacement rate determines deposition time. It is preferably greater than 100 mm·s$^{-1}$ to limit the deposition phase to one minute, as rapid deposition enables the substrate to be covered while limiting premature drying as a function of the deposition time. The upper limit of 500 mm·s$^{-1}$ corresponds to the limit of the equipment used.

Step a) is generally carried out at a temperature of 18 to 22° C., and a relative humidity of 40% to 50%.

At the end of the spraying step a) of the method according to the invention, a wet layer of the colloidal or polymeric suspension or suspension or solution of organic polymer is obtained on the surface.

The thickness of the wet layer of colloidal or polymeric suspension or suspension or solution of organic polymer can be from 10 to 150 μm, preferably from 10 to 120 μm.

Following the spraying step a), step b) of the method according to the invention is carried out, during which drying of the wet layer of the colloidal suspension, of the suspension comprising an inorganic compound in polymeric form, or of the solution or suspension of an organic polymer is carried out.

When implementing a colloidal suspension or a solution or suspension of an organic polymer, the final dry thin layer is obtained on the surface at the end of step b).

To obtain a thin layer of uniform, controlled thickness, generally less than 300 nm, and free from defects such as cracks, and especially of optical grade, it is important, if not critical, to control solvent evaporation by controlling one or more, or even all, of the following parameters governing drying, namely:

Drying temperature.

Drying duration.

Atmosphere in which the surface is placed during drying.

Controlling solvent evaporation during this drying step is indeed essential to obtain a layer of uniform, homogeneous thickness, especially of optical grade. Drying generally has to be carried out at a temperature that is not too high. Thus, drying can be carried out at a temperature of 18 to 50° C.

Drying generally has to be carried out over a duration that is not too short.

Thus, drying can be carried out for a duration of 10 minutes to 90 minutes, preferably 30 to 60 minutes, still preferably 30 to 40 minutes.

It should again be noted that water, which constitutes at least 95% of the solvent of the colloidal and polymeric sols and solutions and suspensions of organic polymer implemented according to the invention, has a higher boiling temperature and vaporisation enthalpy at room temperature than ethanol, which makes it possible, for the same volumes of sols, solutions or suspensions, to slow down drying. Slower drying enables the liquid film to become as homogeneous and smooth as possible, and thus layers of better optical grade to be obtained.

To obtain a dry layer that is homogeneous, uniform in thickness and free from defects such as cracks or the like, drying is, according to the invention, carried out in a static atmosphere, especially without circulation or flow of air or any other gas on and around the surface; preferably, drying is carried out in a closed, hermetic enclosure in which there is no circulation or flow of air or any other gas.

The drying conditions specified above apply whether a colloidal suspension, a suspension comprising an inorganic compound in polymeric form or a suspension or solution of an organic polymer is implemented.

Optionally, following the drying step, a heat treatment of the wet layer which has undergone the drying step may be carried out, especially in the case where, during step a), spraying of a suspension comprising an organic compound in polymeric form is performed. In the case where a polymeric sol has been sprayed, this heat treatment step enables the inorganic-organic hybrid polymer to be transformed into a fully inorganic, mineral polymer.

This heat treatment can be carried out at a temperature of 100 to 200° C., preferably 100 to 150° C., for a duration of 30 minutes to 2 hours, preferably 60 minutes.

The method according to the invention makes it possible to make coatings, especially colloidal silica optical grade coatings, that is, especially having homogeneity, uniformity of deposition in thickness, with a variation in thickness not exceeding 5 nm, or even 2 nm (for a layer with a thickness greater than or equal to nm), over a layer thickness less than a few hundred nanometres, more precisely a thickness of 5 nm to 300 nm, preferably 80 to 220 nm.

It should be noted that the use of surfactants leads to an edge effect. Indeed, over 0.5 to 1.5 cm, there is a shrinkage of the liquid film without drying.

The thin layers obtained by the method according to the invention have transmissions of at least 99%, and can achieve 99.5% (see FIG. 4), especially at a centring wavelength of 371 nm.

Such transmissions are obtained with a colloidal silica layer obtained by the method according to the invention with an estimated thickness of 76 nm.

Absorption of UV radiation can occur at short wavelengths below 230 nm, when the sol contains an aromatic ring-containing surfactant: Triton™ X-100.

The thin layers prepared by the method according to the invention can especially be anti-reflective layers. These anti-reflective layers are especially useful for anti-reflective coatings of optics, especially silica optics subjected to laser radiation.

Thin layers of organic polymers prepared by the method according to the invention can be protective layers on a substrate.

The invention will now be described with reference to the following illustrative and non-limiting examples.

Example 1

Colloidal Silica

The substrate used is made of silica, with a surface area of 200 by 200 mm 2 and a thickness of 5 mm.

Its refractive index is 1.44 at 600 nm.

The substrate is cleaned using the following procedure: cleaning of the surface with a 0.4% dilute volume solution of hydrofluoric acid, and then thorough rinsing with pure deionised water. The substrate is left to dry in the open air, positioned vertically on a corner using a carrier.

1) A suspension (sol) of colloidal silica in water has been prepared using a colloidal suspension synthesised according to the Stöber method. 50.7 g of tetraethyl orthosilicate have been added to 388.0 g of absolute ethanol. 15 minutes of stirring ensure good homogenisation. 13.4 g ammonia 28% by mass have been added thereto. After a further 15 minutes stirring, the solution is left to ripen for 3 weeks at room temperature. A grain size measurement indicates the presence of silica colloids with a size of 10±5 nm. The pH is 10 and the $SiO_2$ mass concentration is 3.8%.

2) To obtain an aqueous sol, approximately 23.7 g of colloidal silica sol are retrieved to prepare 90 g of sol diluted in 1% by mass ethanol. This sol is then placed in a dialysis membrane with a diameter of 34 mm and a MWCO of 3.5 kDa (that is, for silica, particles with a diameter of 1.7 nm are retained at over 80%). This membrane is placed in a tank containing 4.5 L of pure water under magnetic stirring. Dialysis lasts a minimum of 48 hours, at the end of which the water content of the sol in the membrane is evaluated by measuring the surface tension. If it is 70±3 $mN \cdot m^{-1}$, the sol is characterised as specified in Table I below:

TABLE I

| | |
|---|---|
| $SiO_2$ mass concentration | 0.12 |
| Grain size (in nm) | 15 |
| Surface tension | 68.2 |
| Water content deduced from surface tension | 99% |
| Solvent density | 0.995 |
| Water content deduced from density | 100% |
| Viscosity (in cP) | 1.04 |

3) To 56.12 g of aqueous solution, 0.60 g of 1% by mass dilute Triton™ X-100 solution is added. Such an amount makes it possible to be at the critical micellar concentration of Triton™ X-100 in water, thus enabling surface tension to be reduced to 39.40 $mN \cdot m^{-1}$ with no impact on sol stability, as evidenced by a grain size distribution without any noticeable time course over 3 months.

4) The supply syringe of the PRISM Ultra-coat 300 spray apparatus is filled with Triton™ aqueous silica sol. A small stirrer in the syringe is actuated. After initialising the solution supply, the substrate is introduced into the centre of the booth. An air barrier is placed behind the doors of the booth in order to cut off any air circulation. The doors themselves are caulked at the corners before starting the deposition procedure. Deposition parameters are specified in the following Table II:

TABLE II

| Head sweep rate ($mm \cdot s^{-1}$) | Solution flow rate ($mL \cdot min^{-1}$) | Displacement pitch (mm) | Head/substrate distance (mm) | Start coordinates x1; y1 | End coordinates x2; y2 |
|---|---|---|---|---|---|
| 370 | 8 | 14 (along axis x) | 20 | 400; 10 | 150; 300 |

The coordinates useful for deposition are centred on the centre of the component, substrate, and enable a slightly larger surface area than the component, substrate, to be swept to ensure full coating of the liquid onto the substrate.

Figure 2:
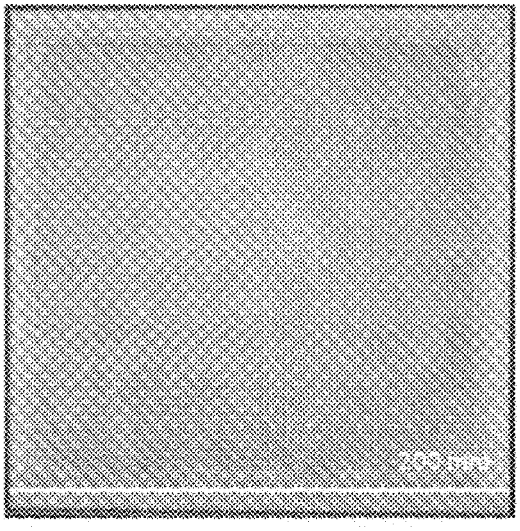
FIG. 2 is a photograph showing the appearance of a coating on one face of a substrate. This coating consists of a layer prepared in Example 1 by the method according to the invention.
Figure 3:
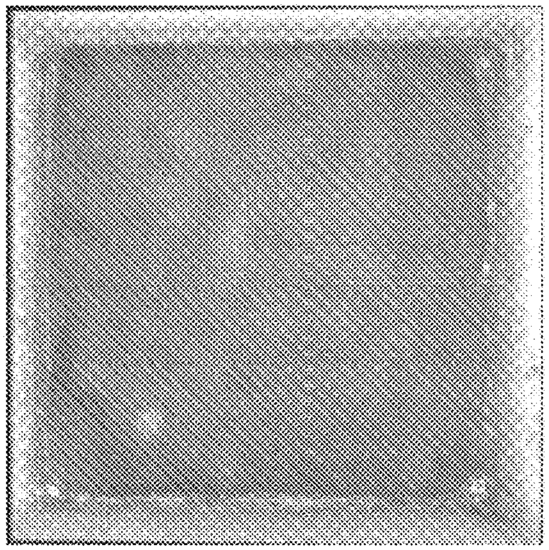
FIG. 3 is a photograph showing the appearance of a symmetrical coating on two faces of a substrate. This coating consists of a layer, prepared in Example 1 by the method according to the invention.

Deposition is carried out onto a first face, left to dry for about 30 min, then repeated onto the second face with a same drying time. The deposit is observed under negatoscope light (a broad, diffused light source; the substrate returns the reflection of this light which exacerbates optical defects). The photographs of FIGS. 2 and 3 show these observations.

Transmission is also measured as a function of wavelength of the symmetrical coating on two faces prepared in this example.

Figure 4:
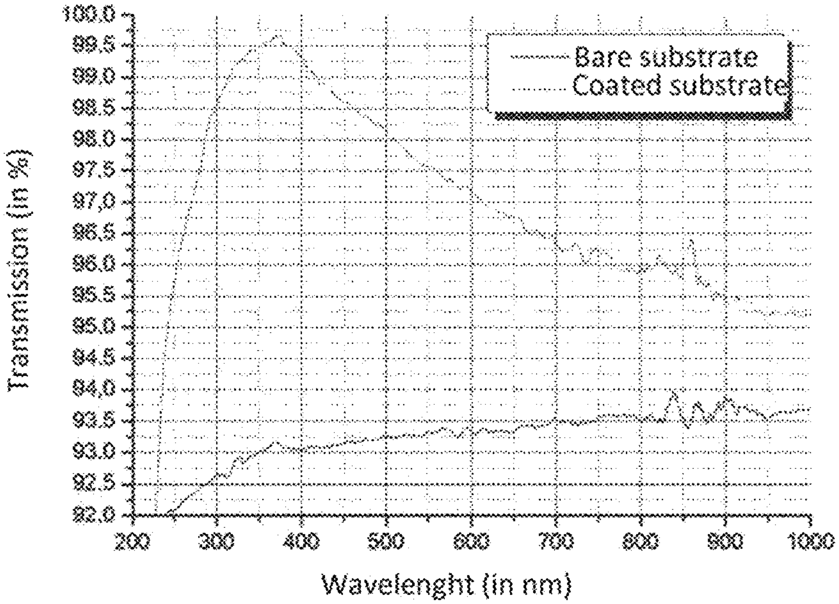
FIG. 4 is a graph showing the transmission spectrum of the bare substrate (bottom curve in solid lines), and the transmission spectrum of the substrate symmetrically coated on its two faces with a layer prepared in Example 1, in accordance with the method according to the invention (top curve in dotted lines).

The results of these measurements are shown on the graph of FIG. 4.

The transmission of the deposits reaches 99.5% at 370 nm, compared with 93.1% for a bare silica substrate.

The silica index at 370 nm is 1.47. The index of the layers made is 1.27 at 370 nm, from which 48% porosity in the layers is deduced. Such a layer fulfils an anti-reflective function, with maximum effectiveness at the centring wavelength, 370 nm here.

Example 2

"Polymeric" Silica

The substrate used is identical to that in Example 1.

1) A polymeric silica suspension in water has been prepared from a sol synthesised in ethanol according to the following method.

52 g of tetraethyl orthosilicate have been added to 429.2 g of absolute ethanol. 15 minutes of stirring ensure good homogenisation. 0.1 g of 37% hydrochloric acid diluted in 18.0 g of pure water has been added. After another 15 minutes of stirring, the solution is left to ripen for 3 weeks. The pH is 2 and the $SiO_2$ mass concentration is 3.9%.

2) From the 3.9% solution, 71.4 g of a 1% m dilute polymeric silica solution in ethanol, have been prepared. The polymeric silica solution thus prepared has undergone a dialysis as described in Example 1. At the end of this dialysis, 97.6 g of sol have been obtained, with a 0.4% m silica concentration. Its surface tension is 70.3 $mN \cdot m^{-1}$, that is an estimated water content of more than 99% m.

3) To 71.0 g of aqueous sol, 0.75 g of solution containing 1% m. of Triton™ X-100 is added.

4) The surfactant-added aqueous solution is integrated into the apparatus supply system in the same way as in Example 1. The deposition enclosure is also prepared in the same way. The deposition parameters are identical to those in Example 1, and are indicated in Table III below:

TABLE III

| Head sweep rate (mm · s⁻¹⁾ | Solution flow rate (mL · min⁻¹) | Displacement pitch (mm) | Head/substrate distance (mm) | Start coordinates x1; y1 | End coordinates x2; y2 |
|---|---|---|---|---|---|
| 370 | 8 | 14 (along axis x) | 20 | 400; 10 | 150; 300 |

Deposition is carried out symmetrically on both faces of the substrate. The drying time after each deposition is 30 min. After deposition, the transmission of the component, substrate, is measured, and then the coated substrate undergoes a heat treatment at 130° C. for one hour. This treatment enables the silica film to be densified, improving its mechanical strength, among other things.

FIG. 5 is a photograph taken while observing the substrate provided with a coating on its two faces through a negatoscope (diffuse white light).

The photograph shows nothing apparent to the naked eye, demonstrating that the coating is of optical grade.

Transmission is also measured as a function of wavelength for the coating with two symmetrical faces prepared in this example, before and after heat treatment.

The results of these measurements are shown in the graph of FIG. 6.

The deposit has an index of 1.46 at 500 nm, similar to that observed with polymeric silica deposition in ethanol with other deposition techniques such as dip-coating or spin-coating. Such a layer makes it possible to create a dense silica film, which can act as a transparent protection for a substrate, and optionally serve as a carrier for a subsequent anti-reflective treatment as in Example 1.

Example 3

Colloidal Silica and Polyvinyl Alcohol (PVA)

In this example, PVA is a simple additive, the layer essentially consisting of colloidal silica.

The PVA acts as a binder for the silica particles, in other words as a cement for these particles. PVA also acts as a surfactant.

The substrate is identical to that used in Example 1.

1) Colloidal silica undergoes an identical synthesis as in Example 1.

2) The dialysis step is identical to that described in Example 1, but the sol is diluted in ethanol to 0.6% m, and the amounts involved are doubled. The sol obtained is 100% aqueous, its surface tension is 71.1 $mN·m^{-1}$ for a 0.1% m silica concentration. In 107.2 g of this aqueous sol, 0.1 g of 80% hydrolysed PVA has been introduced. As solubilisation of PVA in water is slow, the whole has been placed under stirring overnight, rather than having to heat to accelerate solubilisation, which would risk promoting aggregation of the silica particles.

3) The sol obtained has a surface tension of 44.2 $mN·m^{-1}$, the PVA having a surfactant character. No other additive has been added.

4) The solution is integrated into the apparatus supply system in the same way as in Example 1. The deposition enclosure is also prepared in the same way. Deposition parameters are indicated in Table IV below.

TABLE IV

| Head sweep rate (mm · s⁻¹) | Solution flow rate (mL · min⁻¹) | Displacement pitch (mm) | Head/substrate distance (mm) | Start coordinates x1; y1 | End coordinates x2; y2 |
|---|---|---|---|---|---|
| 350 | 8 | 12 (along axis x) | 20 | 400; 10 | 150; 300 |

Both faces are coated, after drying for 30 min after each deposition. The same characterisations as in Example 1 have been performed:

The deposit is observed under negatoscope light (a broad, diffuse light source, the substrate returns the reflection of this light which exacerbates optical defects). The photographs of FIGS. 7 and 8 show these observations. FIG. 8 shows the same photograph as FIG. 7, but exacerbating the contrast and dimming the brightness.

Transmission is also measured as a function of wavelength for the coating with two symmetrical faces prepared in this example.

The results of these measurements are shown in the graph of FIG. 9.

This example shows that polymers, especially water-soluble ones, here mixed with colloids, can be spray deposited into aqueous media in the same way as inorganic salts.

Example 4

Poloxamer (three-block copolymer comprising a central block of poly(propylene oxide) and two outer blocks of poly (ethylene oxide), $(EO)_x$-$(PO)_y$-$(EO)_x$).

In this example, the layer prepared consists of poloxamer, which is therefore not a simple additive.

The substrate is identical to that used in Example 1.

1) In 203.8 g of pure water, 0.3 g of Pluronic® F-108 (a poloxamer) has been dissolved. This solution has a surface tension of 44.9 $mN·m^{-1}$; Pluronic® having surfactant properties.

47.8 g of this solution have been retrieved, to which g of 1% by mass Triton solution has been added. The sol has a surface tension of 39 $mN·m^{-1}$.

2) The solution is integrated into the apparatus supply system in the same way as in Example 1. The deposition enclosure is also prepared in the same way. The deposition parameters are indicated in Table V below.

TABLE V

| Head sweep rate (mm · s⁻¹) | Solution flow rate (mL · min⁻¹) | Displacement pitch (mm) | Head/substrate distance (mm) | Start coordinates x1; y1 | End coordinates x2; y2 |
|---|---|---|---|---|---|
| 350 | 8 | 12 (along axis x) | 20 | 400; 10 | 150; 300 |

Both faces are coated, after drying for 30 min after each deposition. The same characterisations as in Example 1 have been performed.

The deposit is observed under negatoscope light (a broad, diffuse light source; the substrate returns the reflection of this light which exacerbates optical defects). The photographs of FIGS. 10 and 11 show these observations. FIG. 11 shows the same photograph as FIG. 10, but exacerbating the contrast and dimming the brightness.

Transmission is also measured as a function of wavelength for the symmetrical coating with two faces prepared in this example.

The results of these measurements are shown in the graph of FIG. 12.

This example shows that purely organic copolymers such as poloxamers, especially water-soluble ones, can be spray deposited into aqueous media in the same way as inorganic salts.

REFERENCES

[1] H. Floch, P. Belleville. "Procédé de fabrication de couches minces présentant des propriétés qptiques"—FR-A1-2 963 558.

[2] X. LeGuevel. "*Elaboration de sols de silice colloïdale en milieu aqueux: fonctionnalisation, propriétés optiques et de détection chimique des revêtements correspondants*", Université Francois Rabelais Tours, Thesis to obtain the degree of Doctor of the University of Tours submitted and publicly defended on 30 Mar. 2006: s.n., 2006.

[3] Q. Z. Huang, J. F. Shi, L. L. Wang, Y. J. Li, L. W. Zhong, G. Xu. "*Study on sodium water glass-based anti-reflective film and its application in dye-sensitized solar cells*", Thin Solid Films, 2016, 610, pp. 19-25.

[4] J. Griffin, A. J. Ryan, D. G. Lidzey. "*Solution modification of PEDOT:PSS inks for ultrasonic spray coating*", Organic Electronics, 2017, pp. 245-250.

[5] C. Girotto, B. P. Rand, J. Genoe, P. Heremans. "*Exploring spray coating as a deposition technique for the fabrication of solution-processed solar cells*", Solar Energy Materials & Solar Cells, 2009, 93, pp. 454-458.

[6] C. Fink-Straube, A. Kalleder, T. Koch, M. Mennig, H. Schmidt. "Method for the production of optical layers having uniform layer thickness"—U.S. Pat. No. 6,463,760 B1, 15 Oct. 2002.

[7] H. Xiong, Y. Tang, L. Hu, B. Shen, H. Li. "*Preparation of $SiO_2$ antireflective coatings by spray deposition*", Proceedings of SPIE. 2019, Vol. 11170, 14th National Conference on Laser Technology and Optoelectronics (LTO 2019), 117037 (17 May 2019).

[8] C. Löser, C. Rüssel. "*Effect of additives on the structure of $SiO_2$ sol-gel spray coatings*", Glastech, Ber, Glass Science Technology 7, 2000, 9, pp. 270-275.

[9] FR-A1-2 703 791.

What is claimed is:

1. A method for preparing a thin layer on at least one surface of a solid substrate, comprising the following successive steps:

a) spraying onto the surface:

a colloidal suspension comprising solid nanoparticles (or colloids) of an inorganic compound dispersed in a solvent, whereby a wet layer of the colloidal suspension is obtained on the surface; or a suspension comprising an inorganic compound in polymeric form in a solvent, whereby a wet layer of the suspension of the inorganic compound in polymeric form is obtained on the surface; or a solution or suspension of an organic polymer in a solvent, whereby a wet layer of the solution or suspension of the organic polymer is obtained on the surface;

said inorganic compound being an inorganic oxide, an inorganic fluoride, an inorganic oxyhydroxide or a mixture thereof and said organic polymer being selected from polyvinyl alcohols, poloxamers and latex-type suspension polymers;

b) drying the wet layer in a static atmosphere;

c) optionally, heat treating the wet layer having undergone the drying step;

whereby the thin layer is obtained;

wherein:

the solvent comprises at least 95% by mass of water and wherein the thin layer has a variation in its thickness of no more than 5 nm over the entire surface, for a thickness of the thin layer greater than or equal to 50 nm.

2. The method according to claim 1, wherein the thickness of the thin layer is from 5 nm to 300 nm.

3. The method according to claim 1, wherein the thin layer has a variation in its thickness of no more than 2 nm over the entire surface, for a thickness of the thin layer greater than or equal to 50 nm.

4. The method according to claim 1, wherein the inorganic oxide is selected from silicon oxides, aluminium oxides, titanium oxides, zirconium oxides, hafnium oxides, thorium oxides, tantalum oxides, niobium oxides, yttrium oxides, scandium oxides, lanthanum oxides, lead oxides, boron oxides, cerium oxides, molybdenum oxides, tungsten oxides, vanadium oxides, $P_2O_5$, alkali metal oxides, alkaline earth metal oxides, mixtures of said oxides and mixed oxides of two or more of the aforementioned elements; and the inorganic fluoride is selected from alkaline earth metal fluorides.

5. The method according to claim 1, wherein the concentration of nanoparticles of an inorganic compound in the colloidal suspension, or the concentration of inorganic compound in polymeric form in the suspension comprising an inorganic compound in polymeric form, or the concentration of organic polymer in the solution or suspension of the organic polymer is from 0.1% to 1% by mass.

6. The method according to claim 1, wherein the colloidal suspension, or the suspension comprising an inorganic compound in polymeric form, or the solution or suspension of the organic polymer has a surface tension of 20 to 73 $mN \cdot m^{-1}$.

7. The method according to claim 1, wherein the colloidal suspension, or the suspension comprising an inorganic compound in polymeric form, or the solution or suspension of an organic polymer further comprises an additive selected from surfactants, thickening agents and flow agents.

8. The method according to claim 1, wherein the colloidal suspension further comprises a water-soluble binder polymer.

9. The method according to claim 1, wherein the surface has a size of at least 400 $cm^2$.

10. The method according to claim 1, wherein the thickness of the wet layer is from 10 μm to 150 μm.

11. The method according to claim 1, wherein in step a) one or more of the following parameters are controlled so as to form a continuous wet layer of homogeneous thickness: flow rate of the colloidal suspension, or of the suspension comprising an organic compound in polymeric form, or of the solution or suspension of an organic polymer, supplying a spray head with which spraying is carried out, displacement rate of the spray head, distance between the spray head and the surface, trajectory described by the spray head.

12. The method according to claim 1, wherein drying is carried out at a temperature of 18 to 50° C., for a duration of 10 minutes to 90 minutes.

13. The method according to claim 1, wherein the thin layer is a layer with optical properties, a hydrophobic layer, a hydrophilic, anti-fogging layer, or a layer with abrasion- or scratch-resistant properties.

14. The method according to claim 13, wherein the optical properties are anti-reflective properties or reflective properties or polarising properties.

15. The method according to claim 14, wherein the thin layer is an anti-reflective layer of a coating of a surface subjected to laser radiation or other radiation.

16. A method for preparing a coating comprising a plurality of layers on at least one surface of a solid substrate wherein at least one of the layers, such as an anti-reflective layer, is deposited by the method according to claim 1.

17. A method for preparing a thin layer on at least one surface of a solid substrate, comprising the following successive steps:

a) spraying onto the surface:

a colloidal suspension comprising solid nanoparticles (or colloids) of an inorganic compound dispersed in a solvent, whereby a wet layer of the colloidal suspension is obtained on the surface; or a suspension comprising an inorganic compound in polymeric form in a solvent, whereby a wet layer of the suspension of the inorganic compound in polymeric form is obtained on the surface; or a solution or suspension of an organic polymer in a solvent, whereby a wet layer of the solution or suspension of the organic polymer is obtained on the surface;

said inorganic compound being an inorganic oxide, an inorganic fluoride, an inorganic oxyhydroxide or a mixture thereof and said organic polymer being selected from polyvinyl alcohols, poloxamers and latex-type suspension polymers;

b) drying the wet layer in a closed, hermetic enclosure in which there is no circulation, flow of air or any other gas;

c) optionally, heat treating the wet layer having undergone the drying step;

whereby the thin layer is obtained;

wherein:

the solvent comprises 95% by mass of water, and wherein the thin layer has a variation in its thickness of no more than 5 nm over the entire surface, for a thickness of the thin layer greater than or equal to 50 nm.

18. The method according to claim 17, wherein the drying is performed for between 10 min and 60 minutes.

19. The method according to claim 1, wherein the static drying is performed for between 10 min and 60 minutes.

* * * * *